United States Patent [19]
Welch

[11] 3,747,435
[45] July 24, 1973

[54] TRANSMISSION
[76] Inventor: Arthur L. Welch, Star Route, Wasilla, Alaska
[22] Filed: June 9, 1971
[21] Appl. No.: 151,346

[52] U.S. Cl. .................................................. 74/688
[51] Int. Cl. ............................................. F16h 47/68
[58] Field of Search ....................... 74/688, 768, 769

[56] References Cited
UNITED STATES PATENTS
3,069,925   12/1962   Roche ............................. 74/668 X
3,209,618   10/1965   Schwab ............................. 74/688
3,507,168    4/1970   Carp ................................. 74/688

*Primary Examiner*—Arthur T. McKeon

[57] ABSTRACT

A transmission having a hydraulic torque converter driving a plurality of planetary gearsets in pure hydraulic drive in starting position. The drive is changed to part hydraulic part direct driven when the torque converter has accelerated the first gearset input member to a predetermined speed. The hydraulic drive of the torque converter then drives the gearset reaction members, and the engine shaft which drives the torque converter directly drives the first gearset input member. Since the gear ratio in the planetary gearsets drops when the torque converter accelerates the reaction member the gearsets are driven successively through a range of ratios ranging from maximum reduction to direct drive.

2 Claims, 1 Drawing Figure

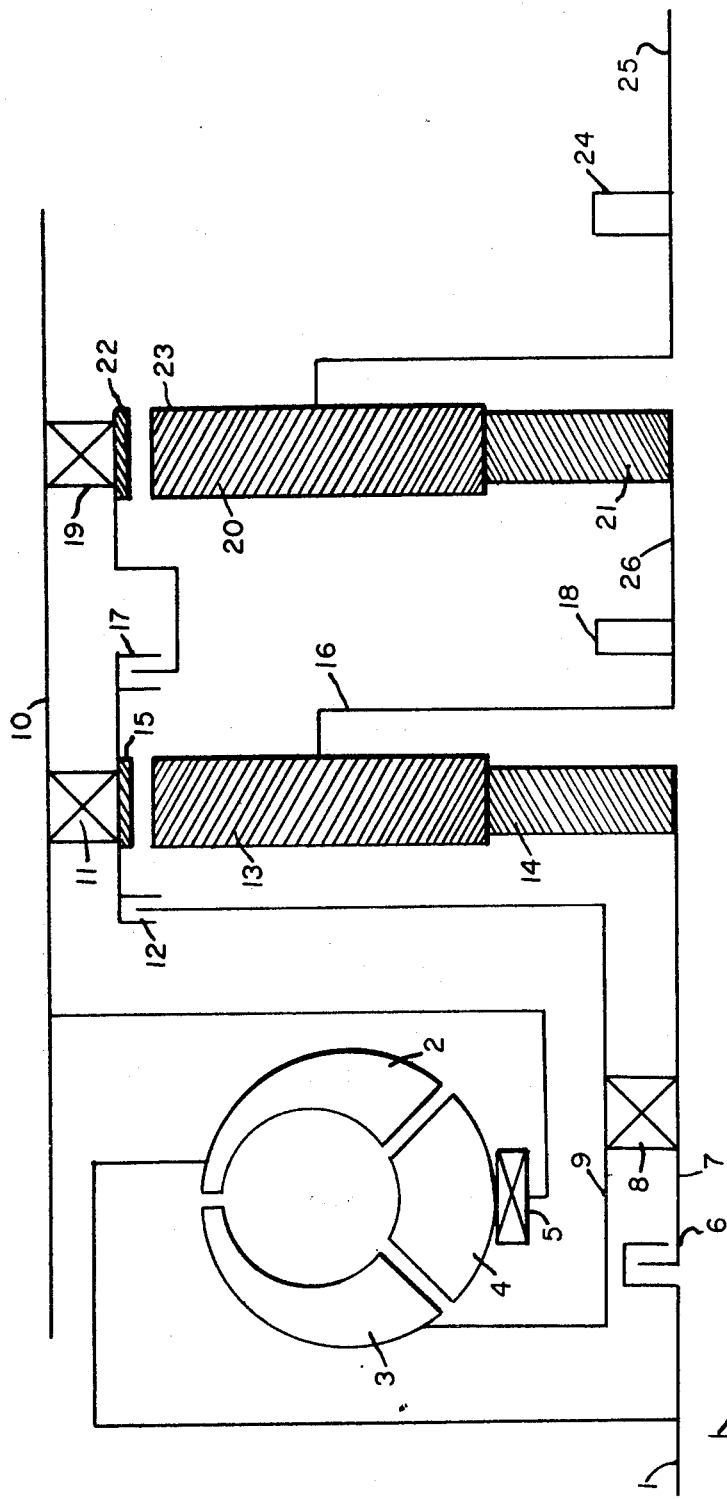

TRANSMISSION

This invention relates to hydrodynamic and planetary split torque transmissions. The transmission of the present invention is related to the transmission of my Ser. No. 86,752 Patent application in the U.S. Patent Office in that both transmissions use a plurality of planetary gearsets connected together in series, output member of preceding gearset connected to and driving the input member of the following gearset, with the hydraulic torque converter driving the gearset reaction members and the driving shaft which drives the torque converter directly driving the first gearset input member. The present invention differs from the Ser. No. 86,752 application in that the torque converter drives the first gearset input member instead of the reaction member in starting position, then shifts the drive of the input member to the drive shaft and the drive of the torque converter to the reaction member. This can allow the use of one less gearset in the present transmission.

The main object of the invention is thus seen to be a transmission having a wide range of ratios from maximum reduction to direct drive.

In the drawings, which form part of the following Specification,

FIG. 1 shows a side view of the transmission.

In the transmission the hydraulic torque converter, shown as impeller 2, turbine 3, stator 4, and freewheel 5 is a hydraulic torque converter which transmits driving shaft 1 power through fluid thrown centrifugally outward by the vanes 2 of the impeller 2, said vanes being slanted backwards from the radial axis of the transmission so they will impell the fluid when impeller 2 is rotated, to the turbine 3 which has vanes 3 arcuately curved along the radial axis of the turbine 3 so they will absorb power from the fluid circulated by impeller 2. When the fluid energes from the inner ends of vanes 3 it is flowing backwards to the direction of the impeller 2 rotation, so stator 4 is placed between impeller 2 and turbine 3. Said stator 4 has vanes which curve axially along the axis of the transmission in a manner which redirects the fluid so it enters the inner ends of the impeller vanes 2 in a forward direction, thereby preventing cavitation of impeller 2, and completing the hydraulic circuit. When the turbine 3 turns at a speed slower than impeller 2 the fluid strikes vanes 3 at a sharper angle and the torque put into impeller 2 by drive shaft 1 is increased or multiplied. The fluid striking the vanes of stator 4 tend to cause it to rotate backwards. Freewheel 5 is placed in the hub of stator 4 and allows rotation in only a forward direction so the stator will perform its function of redirecting the fluid. When turbine 3 rotates at 85% of the speed of impeller 2 or faster the fluid strikes the backsides of stator 4 vanes and causes stator 4 to rotate forwardly along with impeller 2 and turbine 3. The torque converter then acts as a fluid coupling.

In starting position the power output of the torque converter is transmitted by power transmission means, indicated as hollow shaft 9, to one way clutch 8 to intermediate shaft 7 which drives the first gearset input member which is sun gear 14.

The planetary gearsets shown in FIG. 1 are of the sun gear input, pinion gear carrier output, ring gear reaction arrangement. That is sun gears 14 and 21 act as gearset input members, pinion gear carriers 16 and 23 act as gearset output members, and ring gears 15 and 23 act as gearset reaction members.

In starting position of the transmission this driving of the first sun gear 14 by the torque converter turbine 3, in pure hydraulic drive, gives easy starting of the load driven by the driven shaft 25, which is the transmission output shaft. This easy starting prevents shocks in the drive train and prolongs machinery life. Sun gear 14 meshes with pinion gears 13 which mesh with and react against ring gear 15 which is held from rearward rotation by the one way brake 11. Pinion gears 13 are mounted on pins in pinion gear carrier 16 and cause it to rotate forward at a speed determined by dividing the number of teeth on gear 14 into the number of teeth in ring gear 15 and adding one turn. Carrier 16 is connected to and supplies power by power transmission means, indicated as shaft 26, to second gearset sun gear 21, which meshes with pinion gears 20 which mesh with and react against ring gear 22 which is held from rearward rotation by brake means 19, which might by a one way brake, or more advantageously, a band type brake which could serve as a means for starting the transmission. Pinion gears 20 impart rotation to second gearset pinion gear carrier 23 which is connected to driven shaft 25, which serves as output shaft for the whole transmission. If it is desired more gearsets can be placed between carrier 23 and driven shaft 25. As can be seen from the foregoing description and transmission operates at maximum reduction between drive shaft 1 and driven shaft 25 when the torque converter turbine 2 is connected through freewhell 8 and intermediate shaft 7 to the first gearset sun gear 14.

Engaging clutch 6 transmits drive shaft 1 power directly to sun gear 14 by way of intermediate shaft 7, overriding freewheel 8 as soon as clutch 6 is engaged. At the same hydraulic driven connecting time clutch 12 is engaged, transmitting turbine 3 power to ring gear 15 and effecting part hydraulic partdirect drive in the first gearset one way brake 11 is overridden when clutch 12 is engaged.

It can be seen that the first gearset is now being driven from both ends, that is from the now hydraulic driven reaction member 15 end as well as the input member 14 end. Pinion gear carrier 16 is thus driven forwardly at increased speed and thus second gearset carrier 23 and driven shaft 25 at increased speed, but with the second gearset still operating at maximum reduction because ring gear 22, the second gearset reaction member is still held by brake 19. When turbine 3 has accelerated ring gear 15 to a predetermined speed, generally near matched speed Of sun gear 14 and ring gear 15, clutch 17 is engaged, connecting the two ring gears 15 and 22 together and effecting part hydraulic part direct drive in the second gearset. Both reaction member brakes 11 and 19 are now overriden, and the torque converter drives the connected ring gears 15 and 22 at the highest speed the load on driven shaft 25 will allow, said speed under light loads being nearly matched with driving shaft 1 speed, or direct drive.

The lowest practical ratio of input to output member in gear ratios arranged with sun gear as input member and ring gear as reaction member as shown in the drawing is about 2.75 turns input to one turn of output member. Two gearsets arranged in series as shown would have a total ratio of 7.56 to 1. It would appear from this that the torque converter turbine 3 would be overcome by the reaction of the gearsets, and be rotated backwards.

The turbine 3 is not overcome as long as it rotates at one-fourth the speed of drive shaft 1 or faster. With the first reaction member, shown as ring gear 15 in the drawing, rotating at one-fourth the speed of driveshaft 1 only 1.97 turns of driveshaft 1 are required to effect one turn of output member 16. With two gearsets having ring gears 15 and 22 locked together and turning one-fourth the speed Of drive shaft 1 the ratio is 2.86 to 1. With three gearsets, not shown, with ring gears locked together and turning one-fourth the speed of drive shaft 1 the ratio is 3.57 to 1. With the first ring gear 15 turning at one-half the speed of drive shaft 1 the ratio is 1.47 to 1, with both ring gears 15 and 22 locked and turning one-half the speed of drive shaft 1 the ratio is 1.77 to 1. If the ring gears turn at one-half the drive shaft 1 speed the ratio never drops lower than 2 to 1.

As stated above the gearsets are driven from both ends in split torque drive. So to calculate ratios it is necessary to determine the ratios of both input member drive and reaction member drive. This is done by dividing the driving member into the reaction member and adding one turn, then converting the ratio to percentage by dividing the ratio into 1. With 2.75 ratio gearsets as shown in FIG. 1 the ratio with reaction member 15 driving is 1.57 to 1. The output member 16 advances 36 percent for one turn of input member 14 and 64 percent for one turn of reaction member 15. The two percentages add up to one or direct drive. If the ring gear 15 is turned only one-half turn the output member 16 advances only 32 percent, so 32 percent plus 36 percent equals 68 percent divided into 1 gives 1.47, the ratio. With two gearsets as shown in FIG. 1, the second gearset input member turns only about one-third faster than the second gearset reaction member 22 which turns at one-half the speed of drive shaft 1. To calculate the ratio the percentage of advance (68 percent) of the gearset output member 16 is multiplied by the percentage of advance caused by the first input member 14, which is 36 percent. This gives 24.5 percent which is added to the advance caused by the reaction member 22, or 24.5 percent plus 32 percent equals 56.5 percent divided into 1 gives 1.77, the ratio of the second output member 23 to drive shaft 1. It can thus be seen that the torque converter turbine 3 will turn the two gearset reaction members locked together as long as the turbine speed is about 1/4 drive shaft 1 speed or faster.

The formula for calculating ratios in split torque drive is explained more fully in my patent application Ser. No. 86,752.

I claim as my invention and improvement:

1. In a hydrodynamic and planetary split torque transmission; a transmission case housing a driving shaft, an intermediate shaft and a driven shaft, a direct drive power train between said driving and driven shafts and a hydraulic power train surrounding said direct drive power train; said power trains including a plurality of planetary gearsets, each of said gearsets having an input member, an output member, and a reaction member adapted to be hydraulically driven; said direct drive power train including connecting clutch means between said driving and intermediate shafts, power transmission means connecting each gearset output member to the following gearset input member, brake means between each gearset reaction member and the transmission case, said brake means preventing rearward rotation of the associated gearset reaction member, the first gearset input member being directly driven through connection with said intermediate shaft when the clutch means between said driving shaft and intermediate shaft is engaged, with each gearset output member driving the following gearset input member through connection of said power transmission means, said driven shaft connected to the last gearset output member; said hydraulic power train including a hydraulic torque converter and means for transmitting hydraulic power to the first gearset input member when starting the transmission, and means for transmitting hydraulic power to the gearset reaction members upon demand, such hydraulic torque converter having an impeller, a turbine driven by fluid circulated by said impeller, turbine output power transmission means, and a reactor mounted to prevent reverse rotation and adapted to change the ratio of torque transmitted between said impeller and turbine, said means for transmitting hydraulic power to the first gearset input member including a one way clutch between said turbine output power transmission means and said intermediate shaft, said one way clutch driving said first gearset input member through connection to said intermediate shaft when the connecting clutch between said driving shaft and intermediate shaft is disengaged, said one way clutch being overridden when said connecting clutch is engaged, said gearsets operating in direct drive at maximum reduction with reaction members held from rearward rotation by said brake means when the transmission is started; said means for transmitting hydraulic power to the gearset reaction members including connecting clutch means between the torque converter turbine output power transmission means and the first gearset reaction member and connecting clutch means between each two following gearset reaction members, the simultaneous engaging of the driving shaft intermediate shaft connecting clutch and the turbine output power transmission means and first gearset reaction member connecting clutch effecting part direct part hydraulic drive in the first gearset and maximum reduction in the following gearsets, with override of the first gearset reduction member brake means, the sequential engagement of the following gearset connecting clutches effecting part hydraulic part direct drive in the affected gearset and all preceding gearsets with override of the associated reaction member brake means, effecting an infinite range of ratios from maximum reduction to nearly direct drive in the transmission.

2. The transmission of claim 1 in which said planetary gearsets have a sun gear acting as input member, a ring gear acting as reaction member, and pinion gears rotatably mounted in a pinion gear carrier and disposed between and meshing with said sun and ring gears acting as output member.

* * * * *